(12) United States Patent
Braskich et al.

(10) Patent No.: US 8,175,272 B2
(45) Date of Patent: May 8, 2012

(54) METHOD FOR ESTABLISHING SECURE ASSOCIATIONS WITHIN A COMMUNICATION NETWORK

(75) Inventors: Anthony J. Braskich, Palatine, IL (US); Charles R. Barker, Jr., Orlando, FL (US); Stephen P. Emeott, Rolling Meadows, IL (US); Guenael T. Strutt, Sanford, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1108 days.

(21) Appl. No.: 12/037,547

(22) Filed: Feb. 26, 2008

(65) Prior Publication Data

US 2008/0226071 A1 Sep. 18, 2008

Related U.S. Application Data

(60) Provisional application No. 60/894,261, filed on Mar. 12, 2007.

(51) Int. Cl.
*H04K 1/00* (2006.01)
*H04L 29/06* (2006.01)
*H04L 1/00* (2006.01)

(52) U.S. Cl. ..................... 380/258; 713/156

(58) Field of Classification Search ............ 370/254, 370/338; 713/156; 709/201, 227; 707/3; 705/51

See application file for complete search history.

(56) References Cited

U.S. PATENT DOCUMENTS

| 6,707,796 | B1 * | 3/2004 | Li ................................ 370/254 |
| 7,042,988 | B2 | 5/2006 | Juitt et al. |
| 2004/0103282 | A1 * | 5/2004 | Meier et al. .................... 713/171 |
| 2004/0240412 | A1 | 12/2004 | Winget |
| 2005/0152305 | A1 * | 7/2005 | Ji et al. ......................... 370/328 |
| 2005/0201297 | A1 | 9/2005 | Peikari |
| 2005/0254653 | A1 * | 11/2005 | Potashnik et al. ............ 380/270 |
| 2007/0008922 | A1 * | 1/2007 | Abhishek et al. ............. 370/329 |
| 2007/0055877 | A1 * | 3/2007 | Persson et al. ................ 713/171 |
| 2007/0110245 | A1 * | 5/2007 | Sood et al. .................... 380/270 |
| 2007/0189249 | A1 * | 8/2007 | Gurevich et al. ............. 370/338 |
| 2007/0206537 | A1 * | 9/2007 | Cam-Winget et al. ........ 370/331 |
| 2007/0250713 | A1 * | 10/2007 | Rahman et al. ............... 713/171 |
| 2007/0280169 | A1 * | 12/2007 | Cam Winget ................. 370/331 |
| 2007/0288997 | A1 * | 12/2007 | Meier et al. ...................... 726/4 |

(Continued)

FOREIGN PATENT DOCUMENTS

WO 2006/126801 A 11/2006
WO WO2006119281 A3 11/2006

OTHER PUBLICATIONS

M. Zhao, J. Walker, J. Kruys and W.S. Conner—"Abbreviated Security Handshake"—IEEE 802.11-06/1844rO Nov. 2006—47pp.

(Continued)

*Primary Examiner* — Nathan Flynn
*Assistant Examiner* — Abdullah Almamun
(74) *Attorney, Agent, or Firm* — Randi L. Karpinia (57) ABSTRACT

A method for security authentication within a wireless network is disclosed. A method within an adhoc mesh network for two devices to quickly determine roles (i.e. which is the authenticator and which is the supplicant) while establishing a security association is provided for. The invention further provides for the inclusion of cached key information in the role negotiation process and the application of role negotiation to a shortened three-way handshake.

10 Claims, 6 Drawing Sheets

U.S. PATENT DOCUMENTS

| | | | | |
|---|---|---|---|---|
| 2008/0069351 | A1* | 3/2008 | Walker et al. | 380/200 |
| 2008/0313698 | A1* | 12/2008 | Zhao et al. | 726/1 |
| 2009/0303934 | A1* | 12/2009 | Abhishek et al. | 370/328 |
| 2010/0070767 | A1* | 3/2010 | Walker et al. | 713/169 |

OTHER PUBLICATIONS

IEEEP802.11s/D1.00—Draft Amendment—Telecommunications and Information Exchange Between Systems—LAN/MAN Specific Requirements—Part 11: MAC and PHY specifications: Amendment ESS MESH Networking—pp. 60-66 (Sections 7.3.2.62 through 7.3.2.68)—pp. 74-107 (Section 7.4A though Section 8).

PCT/US2008/055739, International Search Report and Written Opinion, mailed Oct. 14, 2008, 13 pages.

Braskich, Tony et al., "Efficient Mesh Security and Link Establishment," IEEE 802.11-06/1470r3, Nov. 1, 2006, 60 pages; pp. 23-55.

PCT/US2008/055739, Preliminary Report on Patentability, mailed Sep. 24, 2009, 8 pages.

* cited by examiner

FIG. 6

METHOD FOR ESTABLISHING SECURE ASSOCIATIONS WITHIN A COMMUNICATION NETWORK

FIELD OF THE INVENTION

The present invention relates generally to wireless communications and more particularly to establishing secure associations between devices operating within a communication network.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. A large network can be realized using intelligent access points (IAP) which provide wireless nodes with access to a wired backhaul.

Wireless ad hoc networks can include both routable (meshed) nodes and non-routable (non-meshed) nodes. Meshed or "routable" nodes are devices which may follow a standard wireless protocol such as Institute of Electrical and Electronics Engineers (IEEE) 802.11s or 802.16j. These devices are responsible for forwarding packets to/from the proxy devices which are associated with them. Non-meshed or "non-routable" nodes are devices following a standard wireless protocol such as IEEE 802.11a, b, e, g or IEEE 802.15 but not participating in any kind of routing. These devices are "proxied" by meshed devices which establish routes for them.

As wireless communications networks become more prevalent, security continues to be a major concern to both communication network providers and end users. This is most evident when using a mobile wireless network where the security environment can offer the greatest challenges since data may be readily received and manipulated by many nodes. The radio links used in a wireless network expose the signaling and data traversing the network to eavesdroppers and/or would-be hackers. In a multi-hop wireless network, this requires each link in the meshed devices to have a unique security association established through the multi-hop authentication and key management process. Then, the air frames on the link can be protected with the established security associations.

Today's security solutions typically establish a security association between an authentication server and a node joining the network. Unfortunately, it can take ten seconds for the node to complete authentication with an authentication server. When a node joins an ad hoc network and establishes a secure link with one of its neighbors, it is advantageous to provide an accelerated security mechanism enabling secure links between the node and other neighboring nodes that are also members of the network quickly.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to establishing secure associations within an adhoc wireless network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of establishing secure associations within an adhoc wireless network described herein. The non-processor circuits may include, but are not limited to, a radio receiver, a radio transmitter, signal drivers, clock circuits, power source circuits, and user input devices. As such, these functions may be interpreted as steps of a method to perform establishing secure associations within an adhoc wireless network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Within ad hoc networks it is desirable, and many times necessary, to establish at least one, and in many cases several, peer links with one or more peer mesh point (MP). MPs will not transmit data frames or management frames other than the ones used for link establishment until the peer link has been established successfully. The MP drops such frames from a peer MP if it considers the link is not established.

A MP must be able to establish at least one mesh link with a peer MP, and may be able to establish many such links simultaneously. It is possible that there are more candidate peer MPs than the device is capable of maintaining peer links with simultaneously. In this case, the MP selects which MPs to establish peer links with based on some measure of signal quality or other information received from candidate neighbor MPs.

The MP starts the peer link establishment protocol, for example, in cases such as the two following scenarios. In each of these scenarios, the MP is issued a command by the IEEE 802.11 station management entity (SME). In a first scenario, the MP has not reached the maximum number of neighbors and is willing to accept new connections. In this scenario, a Passive Open command causes the MP to start a link establishment protocol instance and listen to incoming connection requests. In an exemplary embodiment of the invention, the Passive Open command is a MLME-PassivePeerLinkOpen( ).request primitive. In a second scenario, the MP agrees with the profile carried in a beacon or a probe response from a peer MP and it has not reached the maximum number of neighbors. An Active Open command is issued that causes the MP to initiate a link establishment protocol instance with the peer MP identified as peerId and actively send a connection request to this peer MP. In an exemplary embodiment of the invention, the Active Open command is a MLME-ActivePeerLinkOpen(peerId).request primitive.

The MP can also end the protocol instance, for example, as in three following scenarios. In a first scenario, the MP encounters failure during the peer link establishment procedure. As a result, the MP sends a connection close request. In a second case, the MP receives a connection close request from the peer MP. In a third case, the connection is closed because the MP receives a peer link cancel signal. The 802.11 SME can issue a Peer Link Cancel command. In an exemplary embodiment of the invention, the Peer Link Cancel command is a MLME-CancelPeerLink( ).request primitive. This signal can be triggered by some internal event. For instance, the MP discovers the data transmission failure.

The present invention provides an efficient means of establishing a peer link between two members of an adhoc wireless network via a peer link establishment handshake while simultaneously establishing a security association between the two. The objective is to define a handshake using the fewest number of messages possible while providing mutual authentication, securely transporting and deriving session keys, and ensuring predictable role negotiation.

The present invention provides a method of performing a joint security association and peer link establishment handshake in an efficient mesh security association (EMSA) architecture. The method requires three messages, namely one peer link open, one peer link setup, and one peer link response, in the case that one of the two mesh points initiates the handshake, or four messages, namely two peer link open and two peer link confirms, in the event that a simultaneous open occurs. The method includes built-in support for security suite negotiation and an 802.1X role determination procedure, which provides improved support for cached keys, even in the event both parties cannot retrieve keys from an EMSA mesh key distributor (MKD).

Figure 1:
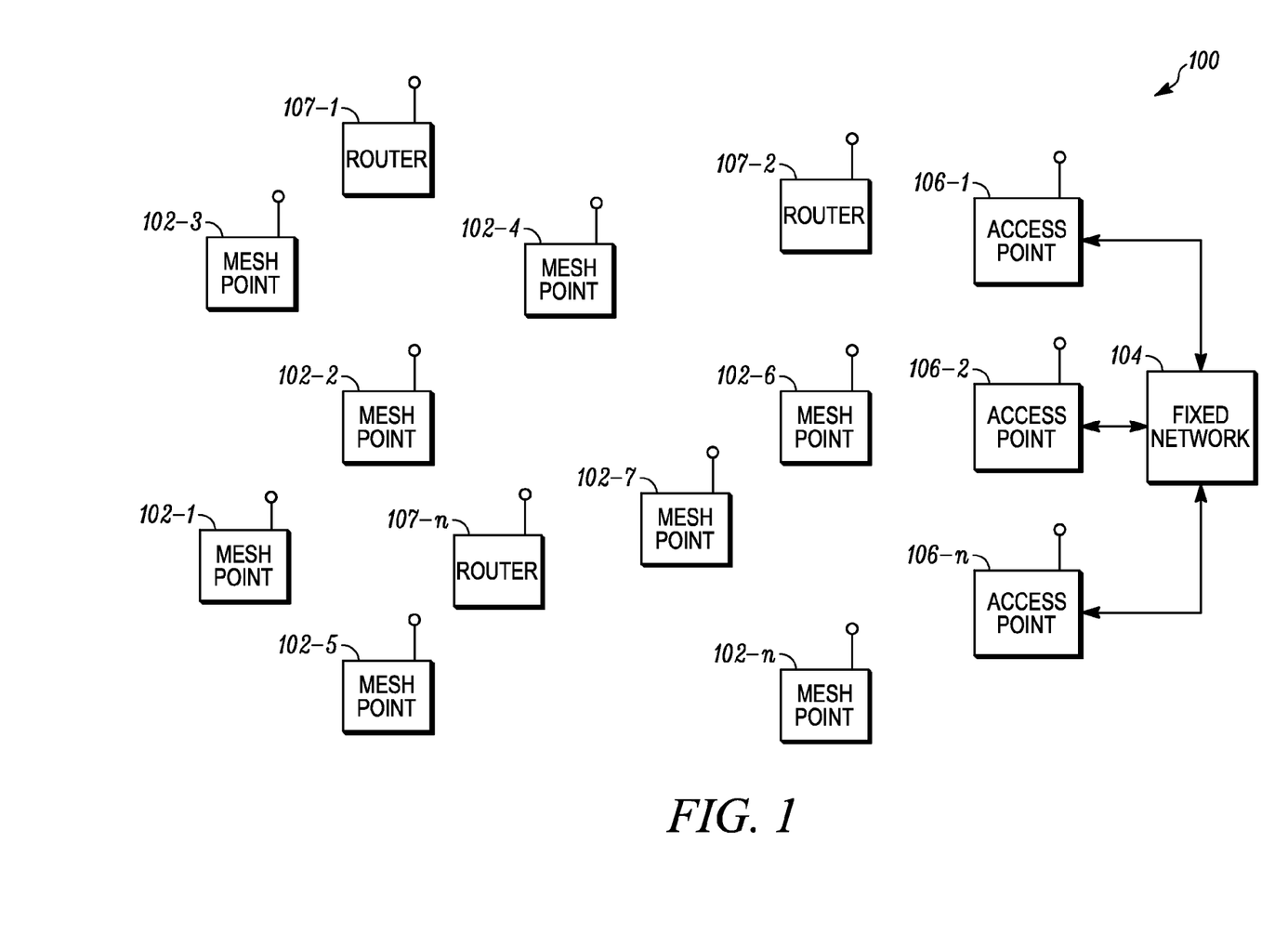
FIG. 1 is an example communication network for implementation of some embodiments of the present invention.

FIG. 1 illustrates an ad hoc wireless network 100 in accordance with some embodiments of the present invention. The ad hoc wireless network 100, for example, can be a mesh enabled architecture (MEA) network or an 802.11 network (i.e. 802.11a, 802.11b, 802.11g, or 802.11s). It will be appreciated by those of ordinary skill in the art that the communication network 100 in accordance with the present invention can alternatively comprise any packetized communication network where packets are forwarded across multiple wireless hops. For example, the ad hoc wireless network 100 can be a network utilizing packet data protocols such as OFDMA (orthogonal frequency division multiple access), TDMA (time division multiple access), GPRS (General Packet Radio Service) and EGPRS (Enhanced GPRS). Additionally, each wireless hop of the packetized communication network 100 may either employ the same packet data protocol as the other hops, or a unique packet data protocol per hop.

As illustrated in FIG. 1, the communication network 100 includes a plurality of mesh points 102-1 through 102-n (referred to also as nodes 102 or mobile nodes 102 or communication devices 102), and can, but is not required to, include a fixed network 104 having a plurality of intelligent access points (IAP) 106-1, 106-2, . . . 106-n (referred to generally as nodes 106 or access points 106), for providing mesh points 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 100 further can include a plurality of fixed or mobile routers 107-1 through 107-n (referred to generally as routers 107 or nodes 107 or communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly or indirectly. When communicating indirectly, one or more other nodes 102, 106 or 107, can operate as a router or routers for forwarding or relaying packets being sent between nodes.

Efficient mesh security association services are used to establish link security between two Mesh Points (MPs) 102 in a wireless mesh network 100. EMSA services are provided through the use of a mesh key hierarchy, a hierarchy of derived keys that is established through the use of a Pre-Shared Key (PSK) or when a MP performs IEEE 802.1X authentication using an extensible authentication protocol (EAP) authentication method.

The present invention includes an authentication mechanism supporting the efficient establishment of security associations between MPs. This mechanism can operate in either mesh supplicant or mesh authenticator roles, depending upon the capabilities and preferences of the MP and the capabilities and preferences of its neighbors. A mesh authenticator is a mesh point that provides authentication before allowing another mesh point to gain access to the network. In an exemplary embodiment of the present invention, the mesh authenticator is an 802.1X authenticator. A mesh supplicant is a mesh point that requests access to the network. It does this by associating with, and then authenticating itself to, an authenticator. In an exemplary embodiment of the present invention, the mesh supplicant is an 802.1X supplicant.

When operating in the mesh authenticator role, a mesh point can allow supplicant mesh points to join a mesh and establish security associations with itself and other members of the network. During an EMSA handshake, one MP will play the role of 802.1X Supplicant, and the other will play the role of 802.1X Authenticator. The present invention further includes a 802.1X role determination procedure for determining during an EMSA handshake which roles are assigned to each MP. This procedure ensures that the role of mesh authenticator and mesh supplicant are uniquely assigned to a single MP prior to the completion of the EMSA handshake.

Figure 2:
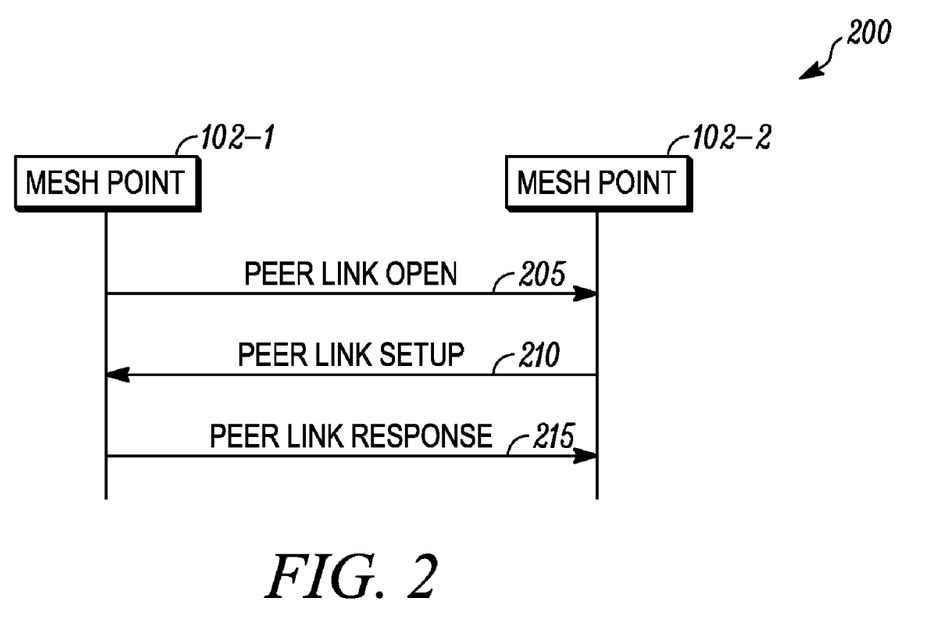
FIG. 2 illustrates a message flow diagram in accordance with some embodiments of the present invention.

FIG. 2 illustrates a message flow diagram 200 in accordance with some embodiments of the present invention. Specifically, FIG. 2 illustrates peer link establishment using the abbreviated EMSA handshake between two mesh points 102-1, 102-2 within the network 100. A MP that initiates the abbreviated EMSA handshake sends a peer link open message 205 containing a Mesh Security Association information element (MSAIE), a Mesh Security Capability information element (MSCIE) and a robust security network information element (RSNIE), where the RSNIE contains a Pairwise Master Key identification (PMKID) list. The PMKID list contains one or two entries that identify the shared Mesh Authenticator Pairwise Master Key (PMK-MA) or Keys available to secure the peer link. The Peer Link Open message requests that a link be established between the Peer Link Open sender and the receiver. In the abbreviated EMSA handshake including the peer link setup message 210 and peer link response message 215 of the present invention, the determination of roles depends on the information exchanged in the peer link open message(s) 205. The Abbreviated EMSA handshake allows a MP to establish a Pairwise transient key (PTK) with a mesh authenticator, by utilizing the mesh key hierarchy it established during Initial EMSA Authentication.

Figure 3:
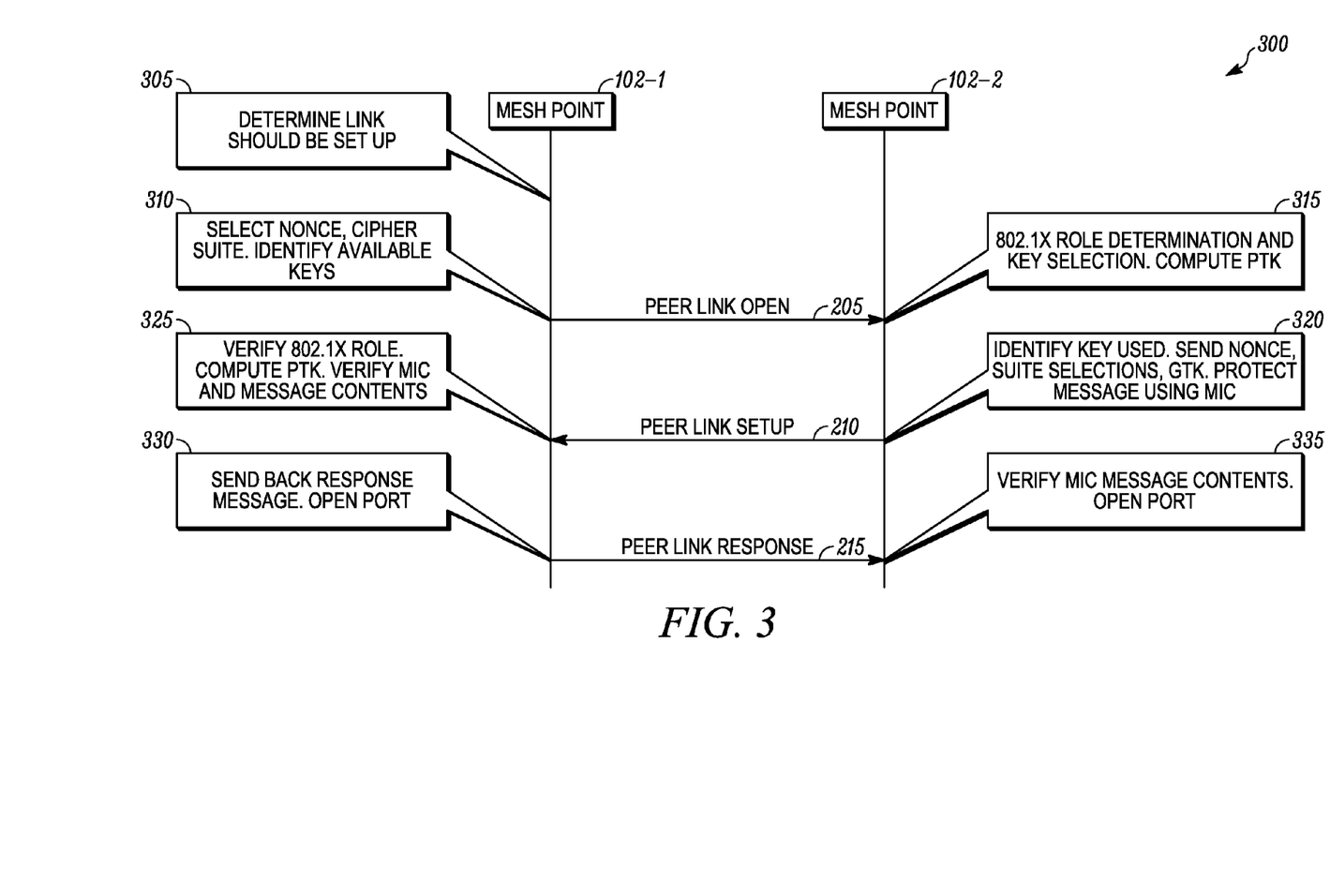
FIG. 3 illustrates more detail of the message flow diagram of FIG. 2 in accordance with some embodiments of the present invention.

FIG. 3 illustrates more detail of the operation of mesh points 102-1 and 102-2 during a peer link establishment 300. As illustrated, the operation begins with block 305 in which mesh point 102-1 determines that a peer link should be set up. It may occur after receiving a beacon, for example. At this point an Active Open command is issued to initiate peer link setup. Next, in block 310, mesh point 102-1 selects a nonce and cipher suite and identifies available master keys. More specifically, in block 310, Upon receiving an Active Open, the MP 102-1: (a) Selects a nonce (Local Nonce field of MSAIE); (b) Selects 1 pairwise ciphersuite from what the peer supports (MSAIE); (c) Determines if the local Mesh Authenticator (MA) function has a cached Mesh Authenticator PMK (PMK-MA) created by peer; and if so, inserts Mesh Key Distributor PMK (PMK-MKD) Name identifying a key that the cached PMK-MA is derived from into the RSNIE (PMKID List); (d) inserts the PMK-MKDName identifying a key created by this MP during Initial EMSA Authentication into the RSNIE (PMKID List) (Note: the PMKID list has either 1 or 2 entries.); and (e) constructs a peer link open message containing: MSCIE, MSAIE, & RSNIE. Mesh point 102-1 then sends a peer link open message 205 to mesh point 102-2.

Next, in block 315, mesh point 102-2, upon receiving the peer link open message 205: (a) examines RSNIE and MSCIE, and determines if it wants to set up a link with the peer 102-1; if not, mesh point 102-2 sends a peer link close message (not shown); (b) does a 802.1X role determination procedure (to be described hereinafter), this determines the PMK-MA to be used; (c) retrieves the PMK-MA if necessary and if acting in 802.1X authenticator role; and (d) selects a nonce and computes the PTK.

Next, in block 320, mesh point 102-2 identifies the key used. After 802.1X role determination and computing the PTK, the mesh point 102-2: (a) constructs its RSNIE including the PMK-MAName in the PMKID list field; (b) constructs the MSAIE containing: both nonces, the identifier of the 802.1X authenticator, the suite selection (supplicant chooses) (note: if supplicant, it makes choice based on peer's capability; if authenticator, it echoes peer's choice from peer link open message), the encrypted group temporal key (GTK), the PMK-MKDName identifying PMK-MKD that the PMK-MA is derived from, and the message integrity code (MIC) over several information elements (IEs). Mesh Point 102-2 sends a peer link setup message 210 containing: MSCIE, RSNIE, and MSAIE to mesh point 102-1. The peer link setup message 210 is protected using the MIC.

Next, in block 325, when mesh point 102-1 receives the peer link setup message 210, mesh point 102-1 verifies the 802.1X role using the 802.1X role determination procedure, computes the PTK, and verifies the MIC and message contents. Upon receiving the peer link setup message 210, mesh point 102-1: (a) if 802.1X authenticator and if necessary, retrieves the PMK-MA using the included PMK-MKDName; (b) computes the PTK using nonces and the PMK-MA; (c) verifies the MIC; (d) verifies the cipher suite selection is supported and was selected by the 802.1X supplicant; and (f) decrypts the GTK. If any components are not verified, then mesh point 102-1 sends a peer link close message (not shown). The Peer Link Close message tries to close the connection between the two MPs.

Otherwise, next, in block 330, mesh point 102-1 constructs and sends back a peer link response message 215 similar to the peer link setup message 210 and opens a port for communication with mesh point 102-2. Specifically, after verifying the peer link setup message 210, mesh point 102-1: (a) constructs its RSNIE including the PMK-MAName in the PMKID list field; (b) constructs the MSAIE containing: both nonces, the identifier of the 802.1X authenticator, the supplicant's cipher suite selection, the encrypted GTK, the PMK-MKDName identifying the PMK-MKD that the PMK-MA is derived from, and the MIC over several IEs. Mesh point 102-1 sends a peer link response 215 containing: MSCIE, RSNIE, and MSAIE. Mesh point 102-1 also installs PTK and GTK. Mesh point 102-1 then opens an 802.1X port for communication with peer mesh point 102-2.

To complete the establishment, in block 335, upon receiving the peer link response 215, mesh point 102-2 verifies the MIC, verifies the RSNIE and the MSCIE match those previously received (in the peer link open message 205), verifies the cipher/authentication and key management (AKM) suite selections are supported and are those selected by 802.1X supplicant, and decrypts the GTK. If any components are not verified, mesh point 102-2 sends a peer link close message (not shown). Mesh point 102-2 then installs PTK and GTK. Mesh point 102-2 then opens a 802.1X port for communication with peer 102-1. In one embodiment (not shown), mesh point 102-2 may send an additional peer link acknowledge message to mesh point 102-1 upon receiving a peer link response message 215 and verifying the contents. One of ordinary skill in the art recognizes that the presence or absence of such an acknowledgement message does not alter the scope of the present invention.

The handshake process described with respect to FIGS. 2 and 3 provides a unique 802.1X role determination procedure. The handshake permits use of cached keys in all scenarios. The handshake utilizes EMSA derived key hierarchy being in place. The handshake provides flexible protocol startup options.

Figure 4:
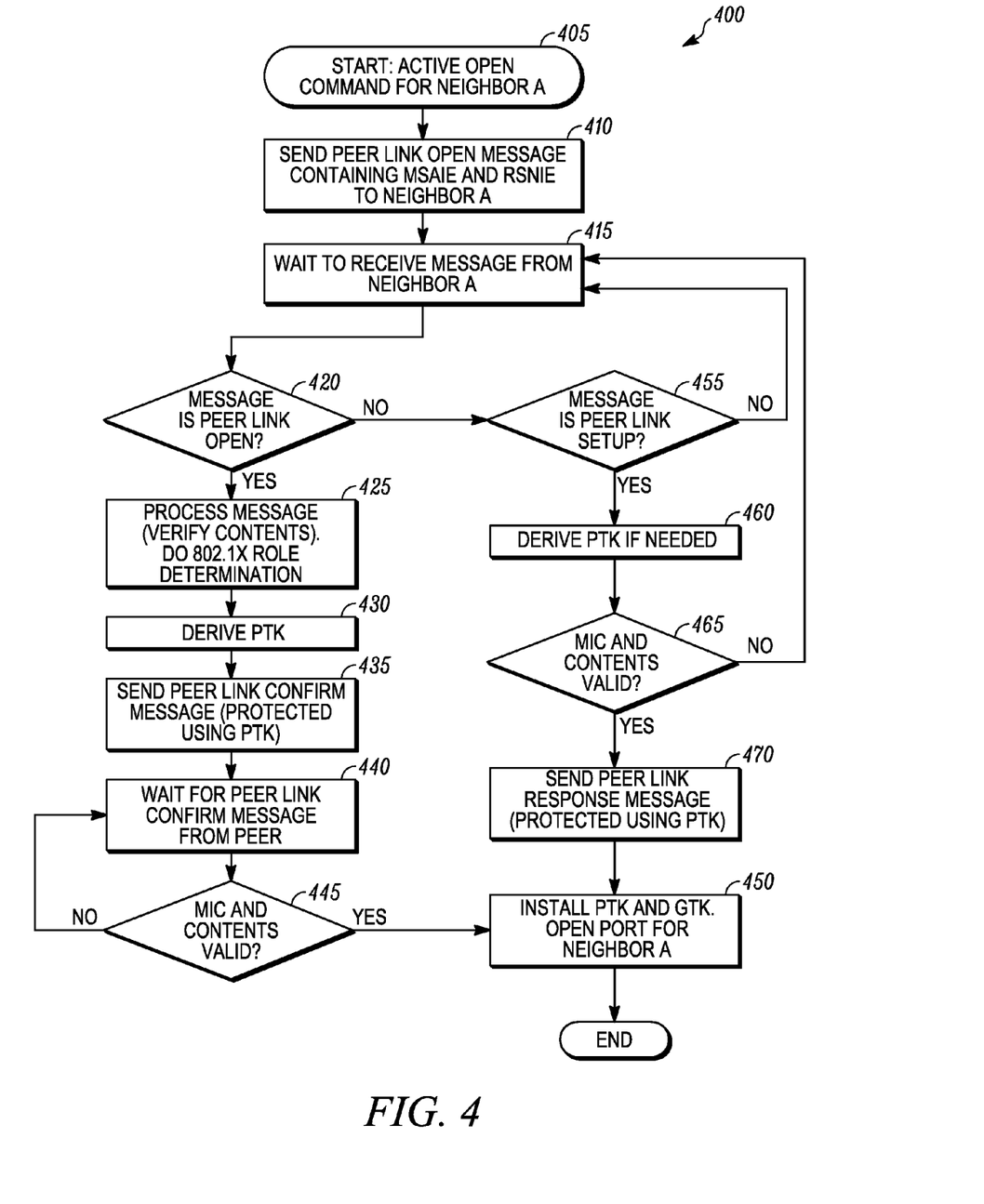
FIGS. 4, 5, and 6 are flowcharts illustrating example operations of a mesh point within the network of FIG. 1 in accordance with some embodiments of the present invention.

FIG. 4 is a flowchart illustrating an example operation of a mesh point 102 in accordance with some embodiments of the present invention. Specifically, FIG. 4 illustrates an active open scenario 400 in which a mesh point 102 sends a peer link open message to actively establish a link with a peer.

As illustrated in FIG. 4, the operation 400 begins with Step 405 with an Active Open command for neighbor A. Next, in Step 410, the mesh point sends a peer link open message containing MSAIE and RSNIE to neighbor A. Next, in Step 415, the mesh point waits to receive a message from neighbor A. In one embodiment (not shown) a timeout process is included to ensure the robustness of the process. After the MP has sent a Peer Link Open message, but has not received a corresponding Peer Link Setup message, a timer, MessageTimer, is set. If the MP has not received the Peer Link Setup when the timer expires, the MP sends a Peer Link Close message to close the link. (not shown)

The neighbor MP may reject the Peer Link Close message if it carries a mismatched instance identifier. The received instance identifier is considered a mismatch in three cases. In case one, the MP does not have a record of instance identifier for the peer MP yet. In case two, the message carries the random value in the Local Link ID field, but it does not match the PeerLinkID recorded locally. In case three, the value in the Peer Link ID field (if it is not null) does not match the local record of LocalLinkID. In the rest of the cases, the instance identifier is considered a match, and the MP accepts the message. Doing so, the MP records the link ID from the peer MP.

Next, in Step 420, the mesh point determines whether a received message is a peer link open message. When the message is a peer link open message, the operation continues with Step 425 in which the mesh point processes the message including verifying the message contents. In one embodiment, the mesh point also does 802.1X role determination. In some embodiments, the MP rejects the Peer Link Open message if it carries a mismatched instance identifier or the configuration parameters in the received message are not acceptable by the MP. The instance identifier carried in the Peer Link Open contains only the link ID provided by the peer. It is considered a mismatch when the MP has the local record of the PeerLinkID and it does not match the received value in the Local Link ID field. Besides the instance identifier, the Peer Link Open message contains configuration parameters. The MP can reject the message if these parameters do not match the local configuration and policy. In other embodiments, the MP accepts the message and records the received configurations that are useful for operations once the link has been established. The mesh point can also store the received value in the Local Link ID field as PeerLinkID if the mesh point does not have a record yet.

Next, in Step 430, the mesh point derives PTK. Next, in Step 435, the mesh point sends a peer link confirm message protected using the PTK. Next, in Step 440, the mesh point waits for a peer link confirm message from Neighbor A (i.e. peer). In one embodiment (not shown) a timeout process is included. After the MP has sent a Peer Link Confirm message, but has not received a corresponding Peer Link Confirm message, a timer, MessageTimer, is set. If the MP has not received the Peer Link Confirm when the timer expires, the MP shall send a Peer Link Close message to close the link. (not shown)

Next, in Step 445, the mesh point determines whether the MIC and contents of the peer link confirm message are valid. If not, the operation cycles back to Step 440. The MP may reject the Peer Link Confirm message if it carries a mismatched instance identifier or the configuration parameters in the received message are not acceptable by the MP. It is considered a mismatch of the instance identifier if the value in the Peer Link ID field of the received message does not match the locally recorded LocalLinkID, or the value in the Local Link ID field of the received message does not match the locally recorded PeerLinkID (if the MP has a local record of PeerLinkID). Besides the instance identifier, the Peer Link Confirm message contains configuration parameters as well. The MP may reject the message if the received parameters do not match the local configuration and policy, or if they are not consistent with the parameters received in an earlier message.

If the MIC and contents are valid, the operation continues to Step 450 in which the mesh point installs PTK and GTK; and opens a port for communication with neighbor A. The operation then ends.

Returning to Step 420, when the message is not a peer link open message, the operation continues to Step 455 in which the mesh point determines whether the message is a peer link setup message. If the message is not a peer link setup message, the operation cycles back to Step 415. If the message is a peer link setup message, the operation continues to Step 460 in which the mesh point derives PTK if needed. Next, in Step 465, the mesh point determines if the MIC and contents of the peer link setup message are valid. If not valid, the operation cycles back to Step 415. If valid, the operation continues to Step 470 in which the mesh point sends a peer link response message protected by the PTK. Next, in Step 450, the mesh point installs PTK and GTK and opens a port for communication with neighbor A. The operation then ends.

Figure 5:
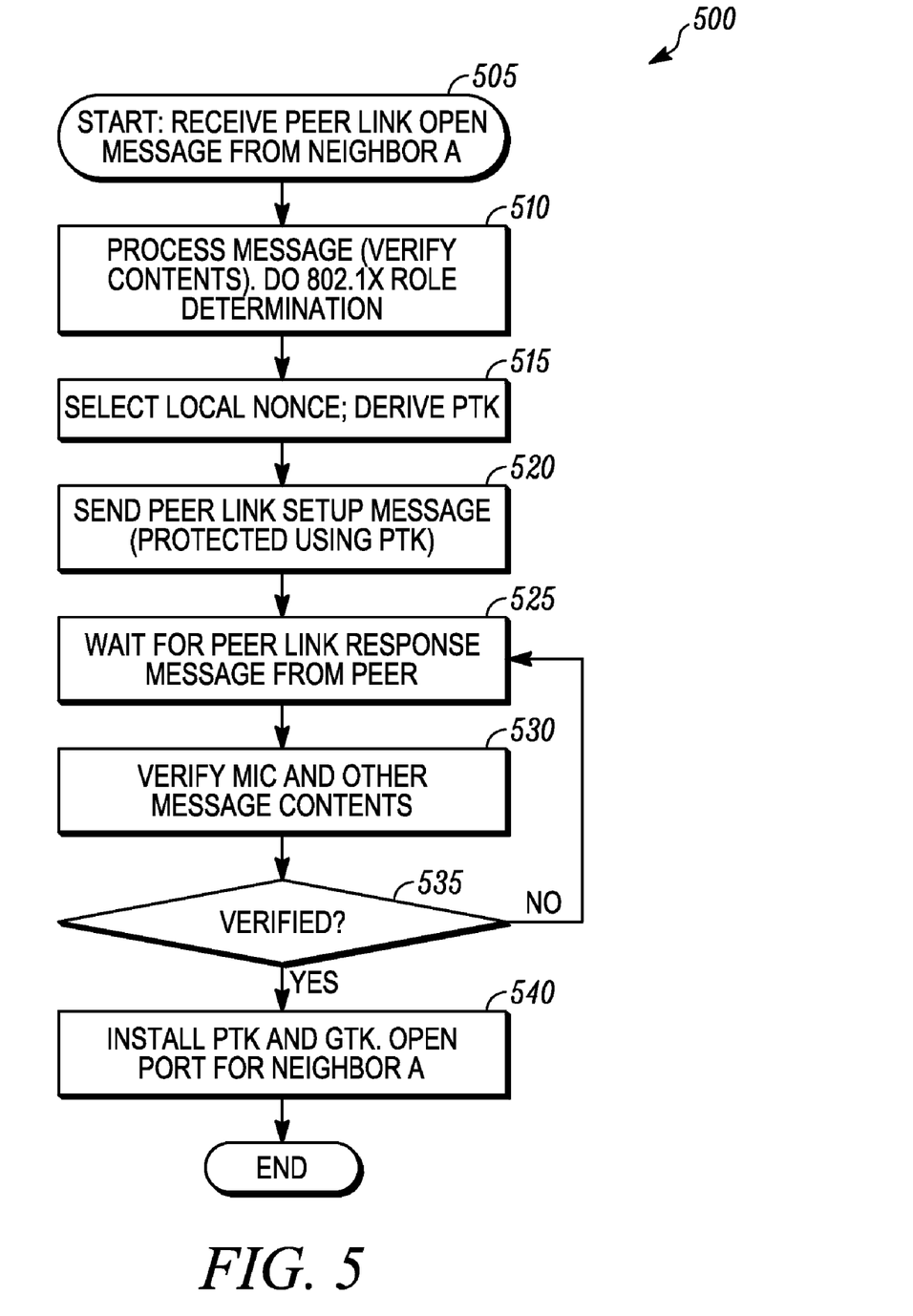

FIG. 5 is a flowchart illustrating an example operation of a mesh point 102 in accordance with some embodiments of the present invention. Specifically, FIG. 5 illustrates a passive open scenario 500 in which a mesh point 102 listens for a peer link open message, and responds in order to set up a link.

As illustrated in FIG. 5, the operation 500 begins with Step 505 in which the mesh point receives a peer link open message from neighbor A. Next, in Step 510, the mesh point processes the peer link open message including verifying its contents. In some embodiments, the mesh point also does 802.1X role determination. Next, in Step 515, the mesh point selects a local nonce and derives PTK. Next, in Step 520, the mesh point sends a peer link setup message protected using the PTK. Next, in Step 525, the mesh point waits for a peer link response message from neighbor A (i.e. peer). In one embodiment (not shown) a timeout process is included to ensure the robustness of the process. After the MP has sent a Peer Link Setup message, but has not received a corresponding Peer Link Response message, a timer, MessageTimer, is set. If the MP has not received the Peer Link Response when the timer expires, the MP shall send a Peer Link Close message to close the link. (not shown)

Next, in Step 530, the mesh point verifies the MIC and other message contents of a received peer link response message. Next, in Step 535, it is determined whether or not the contents were verified. When the contents are not verified, the operation cycles back to Step 525. When the contents are verified, the operation continues to Step 540 in which the mesh point installs PTK and GTK and opens a port for communication with neighbor A. The operation then ends.

In accordance with some embodiments of the present invention, in the operations of FIGS. 4 and 5, when the message processing encounters any error or the MP makes the local decision to close the link, the MP sends a Peer Link Close message to close the link. The MP waits for some time to close the link completely. This graceful time period can be governed by a timer—CancelTimer. Before the CancelTimer expires, the MP continues to respond to any additional Peer Link Open message from the peer MP by sending back the Peer Link Close message. When the CancelTimer expires, the MP eventually closes the link by releasing the local resource allocated for the link instance. This mechanism allows the process to recover from failure quickly.

Figure 6:
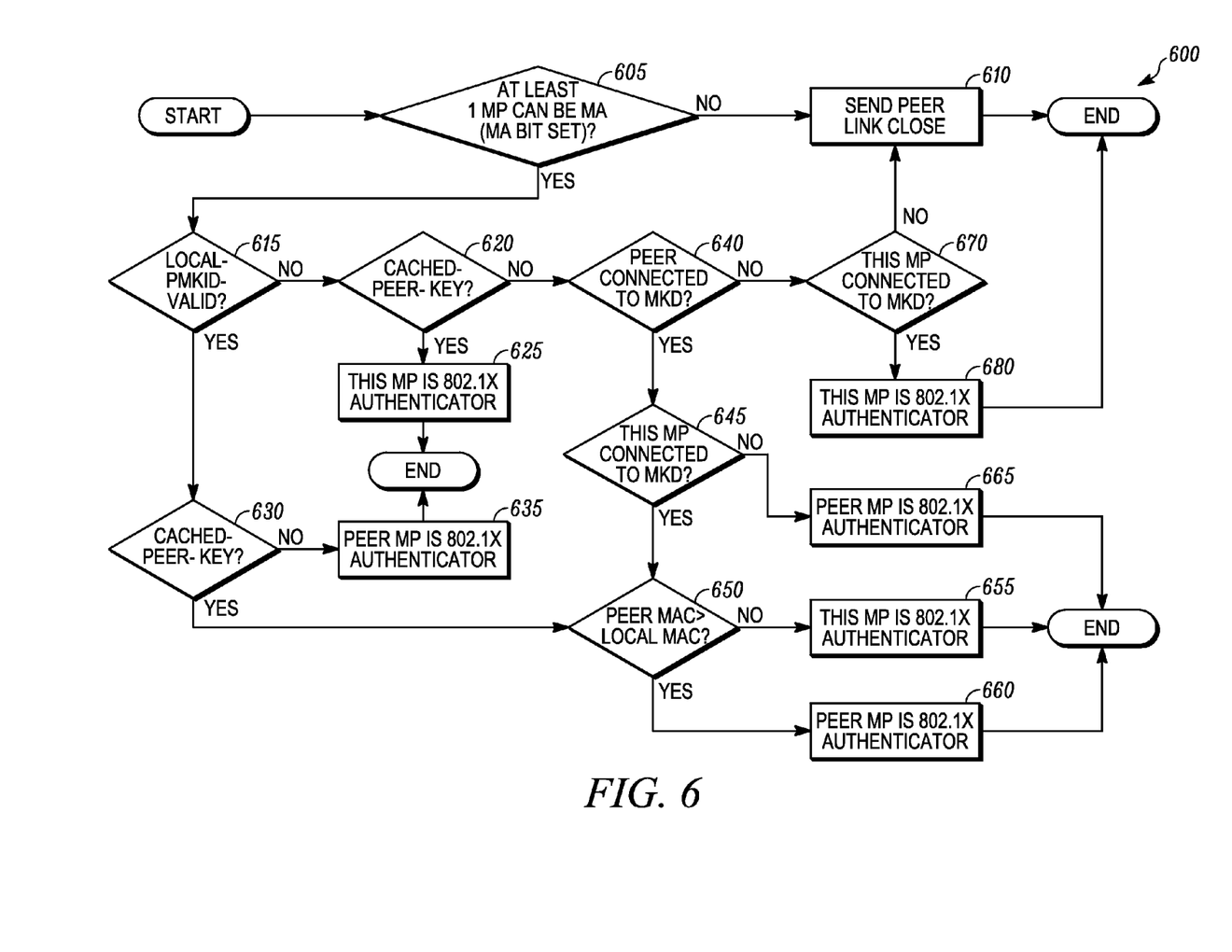

FIG. 6 is a flowchart illustrating an example operation 600 of a mesh point 102 in accordance with some embodiments of the present invention. Specifically, FIG. 6 illustrates an 802.1X role determination procedure 600 within a mesh point in accordance with some embodiments of the present invention. The operation 600 of FIG. 6 can be included, for example, as further detail of Steps 315 and 325 of FIG. 3, Step 425 of FIG. 4, and Step 510 of FIG. 5 as described previously herein. 802.1X role determination assigns the roles of 802.1X authenticator and 802.1X supplicant to the MPs based on the presence of cached keys and the configuration of the MPs. It also determines the PMK-MA to be used to secure the link.

As illustrated in FIG. 6, the operation 600 begins with Step 605 in which the mesh point determines whether at least one mesh point can be a mesh authenticator (MA) (i.e. a mesh authenticator bit is set). If no mesh point can be a mesh authenticator, the operation continues to Step 610 in which the mesh point sends a peer link close message. The operation then ends.

When at least one mesh authenticator is identified in step 605, the operation continues to Step 615 in which the mesh point determines whether the local PMKID is valid. To determine if the local PMKID is valid, the mesh point examines the PMKID List received from a peer MP in a peer link open message. If the PMKID List contains two entries, and an entry corresponds to a PMK-MA that was created by the mesh point during Initial EMSA Authentication, then the local PMKID is valid. When the local PMKID is not valid, or when the PMKID List received from a peer MP contains only a single entry, the operation continues to Step 620 in which the mesh point determines whether a cached peer key exists. To determine if a cached peer key exists, the mesh point examines the PMKID List received from a peer MP in a peer link open message. If the entry that corresponds to a PMK-MA that was created by the peer MP during its Initial EMSA Authentication identifies a key that is locally cached at the mesh point, then the cached peer key exists. When a cached peer key exists, the operation continues to Step 625 in which the processing mesh point is identified as the 802.1X authenticator. The operation then ends.

Returning to Step 615, when the local PMKID is valid, the operation continues to Step 630 in which the mesh point determines whether a cached peer key exists. When no cached peer key exists, the operation continues to Step 635 in which the peer MP is identified as the 802.1X authenticator. The operation then ends.

Returning to Step 620, when no cached peer key exists, the operation continues to Step 640 in which the mesh point determines whether the peer is connected to a MKD. When the peer is connected to the MKD, the operation continues to Step 645 in which the mesh point determines whether it is connected to the MKD. When the mesh point is also connected to the MKD, the operation continues to Step 650 in which the mesh point compares the peer Media Access Control (MAC) to its local MAC. When the peer MAC is less than the local MAC, the operation continues with Step 655 in which the processing mesh point is identified as the 802.1X authenticator. Alternatively, when the peer MAC is greater than the local MAC, the operation continues with Step 660 in which the peer mesh point is identified as the 802.1X authenticator. After both Steps 655 and 660, the operation ends.

Returning to Step 645, when the processing mesh point is not connected to the MKD, the operation continues to Step 665 in which the peer mesh point is identified as the 802.1X authenticator. The operation then ends.

Returning to Step 640, when the peer is not connected to the MKD, the operation continues to Step 670 in which it is determined whether the processing mesh point is connected to the MKD. When the processing mesh point is connected to the MKD, the operation continues to Step 680 in which the processing mesh point is identified as the 802.1X authenticator. The operation then ends.

When, in Step 670, the processing mesh point is not connected to the MKD, the operation continues to Step 610 in which the mesh point sends a peer link close message. The operation then ends.

The present invention as described herein provides a method within an adhoc mesh network for two devices to quickly determine roles (i.e. which is the authenticator and which is the supplicant) while establishing a security association. The invention provides for the inclusion of cached key information in the role determination process and the application of role determination to a shortened three-way handshake.

In the foregoing specification, specific embodiments of the present invention have been described. However, one of ordinary skill in the art appreciates that various modifications and changes can be made without departing from the scope of the present invention. Accordingly, the specification and figures are to be regarded in an illustrative rather than a restrictive sense, and all such modifications are intended to be included within the scope of present invention.

We claim:

1. A method of operation of a mesh point for establishing secure associations within a communication network comprising:

sending a peer link open message to a neighbor node;
receiving a response message from the neighbor node in response to the peer link open message;
processing the response message using a first operation when the response message is a peer link open message;
processing the response message using a second operation when the response message is a peer link setup message;

installing a pairwise transient key (PTK) and an encrypted group temporal key (GTK) as a result of either the first operation or the second operation; and opening a port for communication with the neighbor node.

2. A method as claimed in claim 1, wherein the peer link open message includes a mesh security association information element (MSAIE) and a robust security network information element (RSNIE).

3. A method as claimed in claim 1, wherein the first operation comprises:

processing the response message including verifying the response message contents;

deriving the PTK;

sending a peer link confirm message protected using the PTK;

receive a neighbor node peer link confirm message from the neighbor node;

determining whether the message integrity code (MIC) and contents of the neighbor node peer link confirm message are valid; and continuing to the installing PTK and GTK step when the message integrity code (MIC) and contents of the peer link confirm message are valid.

4. A method as claimed in claim 1, wherein the second operation comprises:

deriving the PTK when needed;

determining whether the message integrity code (MIC) and contents of the peer link setup message are valid; and when the MIC and contents of the peer link set up message are valid:

sending a peer link response message protected by the PTK; and continuing to the installing PTK and GTK step.

5. A method as claimed in claim 1, further comprising prior to the receiving step:

waiting to receive the response message from the neighbor node for a period of time; and sending a peer link close message to close the link when no response message is received during the period of time.

6. A method as claimed in claim 3, wherein the processing step further comprises:

performing an 802.1x role determination including:

assigning a role of an 802.1x authenticator and a role of an 802.1x supplicant to each of the mesh point and the neighbor node based on the presence of one or more cached keys and a configuration of each of the mesh point and the neighbor node.

7. A method as claimed in claim 6, wherein the assigning a role of an 802.1x authenticator and a role of an 802.1x supplicant to the mesh points based on the presence of one or more cached keys comprises:

assigning the role of the 802.1x authenticator to the neighbor node when a local Pairwise Master Key identification (PMKID) is valid and a peer key is not cached; and assigning the role of the 802.1x authenticator to the mesh point when the local PMKID is not valid and the peer key is cached.

8. A method as claimed in claim 7 further comprising:

determining that the local PMKID is valid by:

examining a PMKID List received from the neighbor node in a peer link open message; and when the PMKID List contains two entries, and an entry corresponds to a PMK-MA that was created by the mesh point during Initial EMSA Authentication, then the local PMKID is valid.

9. A method as claimed in claim 7, wherein the mesh point determines whether the cached peer key exists by:

examining a PMKID List received from the neighbor node in a peer link open message; and when the entry that corresponds to a Mesh Authenticator Pairwise Master Key (PMK-MA) that was created by the neighbor node during its initial efficient mesh security association (EMSA) authentication identifies a key that is locally cached at the mesh point, then the cached peer key exists.

10. A method as claimed in claim 6, wherein the assigning a role of an 802.1x authenticator and a role of an 802.1x supplicant to the mesh points based on the configuration of each of the mesh points comprises:

assigning the 802.1x authenticator role to the mesh point when the neighbor node is not connected to a mesh key distributor (MKD) and the mesh point is connected to the MKD;

assigning the 802.1x authenticator role to the neighbor node when the neighbor node is connected to the MKD and the mesh point is not connected to the MKD;

assigning the 802.1x authenticator role to the mesh point when the neighbor node and the mesh point are connected to the MKD and the local MAC is greater than the neighbor node MAC; and assigning the 802.1x authenticator role to the neighbor node when the neighbor node and the mesh point are connected to the MKD and the local MAC is less than the neighbor node MAC.

* * * * *